United States Patent [19]

Koskan et al.

[11] Patent Number: 5,284,512

[45] Date of Patent: Feb. 8, 1994

[54] POLYASPARTIC ACID AND ITS SALTS FOR DISPERSING SUSPENDED SOLIDS

[75] Inventors: Larry P. Koskan, Orland Park; Kim C. Low, Alsip, both of Ill.

[73] Assignee: Donlar Corporation, Bedford Park, Ill.

[21] Appl. No.: 18,008

[22] Filed: Feb. 16, 1993

Related U.S. Application Data

[63] Continuation-in-part of Ser. No. 927,257, Aug. 7, 1992, abandoned, which is a continuation of Ser. No. 665,101, Mar. 6, 1991, abandoned.

[51] Int. Cl.$^5$ .................. C08L 77/04; C08K 5/17; B01F 17/28
[52] U.S. Cl. ...................... 106/416; 106/400; 106/401; 106/437; 106/456; 106/460; 106/464; 106/465; 106/466; 106/467; 106/468; 106/471; 106/472; 106/476; 106/486; 106/491; 106/493; 106/499; 106/501; 106/505; 106/311; 252/351; 252/356; 252/357; 252/363.5
[58] Field of Search ............... 106/400, 401, 416, 437, 106/456, 460, 464, 465, 466, 467, 468, 471, 472, 476, 486, 487, 491, 493, 499, 501, 505, 311; 252/351, 356, 357, 363.5

[56] References Cited

U.S. PATENT DOCUMENTS

| | | | |
|---|---|---|---|
| 3,846,380 | 11/1974 | Fujimoto et al. | 252/352 |
| 4,534,881 | 8/1985 | Sikes et al. | 252/186 |
| 4,640,943 | 2/1982 | Meguro | 106/504 |
| 4,696,981 | 9/1987 | Harada et al. | 525/328.2 |
| 4,732,693 | 3/1988 | Hight | 252/174.17 |
| 4,839,461 | 6/1989 | Boehmke | 252/175 |

OTHER PUBLICATIONS

Emulsifiers and Emulsifying Techniques, Johnson, ed., 1979, Noyes Data Corp., pp. 171–173.

Use of Polymers to Control Scale in Industrial Cooling Water and Boiler Water Systems, Sikes et al., ed. 1988, University of South Alabama Publication Services, entire document.

Primary Examiner—Mark L. Bell
Assistant Examiner—Scott L. Hertzog
Attorney, Agent, or Firm—Olson & Hierl Ltd.

[57] ABSTRACT

Water soluble salts of a $\beta$-polyaspartic acid, i.e., a polyaspartic acid having predominantly beta linkages in the amino acid residue chain thereof, are eminently well suited as dispersants for particulate matter in an aqueous medium.

17 Claims, 2 Drawing Sheets

POLYASPARTIC ACID AND ITS SALTS FOR DISPERSING SUSPENDED SOLIDS

CROSS-REFERENCE TO RELATED APPLICATIONS

This application is a continuation-in-part of U.S. Ser. No. 07/927,257, filed on 7 August 1992, abandoned which application, in turn, is a continuation of U.S. Ser. No. 07/665,101, filed on 6 March 1991, abandoned.

TECHNICAL FIELD

This invention relates to certain water-soluble polyaspartic acid salts and their use as dispersants.

BACKGROUND OF THE INVENTION

The inhibition and dispersion of a broad variety of mineral and metal oxide scales and particulates in water is a common technology used in many different industries. For example, it is used widely in water treatment to prevent scale form forming on heat transfer surfaces and in pipes, in laundry and cleaning products to prevent suspended particles such as dirt from re-adhering to cleaned surfaces, in toothpastes and mouth washes as an anti-tartar agent, in paints and coatings to suspend pigments for ease of shipping, mixing and uniform application, and in polymer systems where emulsion droplets need to be suspended, to name a few.

Examples of the different types of scale and particulates dispersed include $CaCO_3$, $CaSO_4$, $BaSO_4$, $Fe_2O_3$, clays such as kaolin, $TiO_2$, $Zn(OH)_2$, $Ca_3(PO)_4$, $Mg(OH)_2$, $Mn_2O_3$, and many others.

Most dispersants used today are of the synthetic variety, usually a water soluble polymer made from acrylic acid, acrylamide, their derivatives, maleic acid, vinyl esters, and the like. These polymers are non-biodegradable and potentially toxic to the environment. α-Polyaspartic acid also has been suggested as a dispersant; however, its use for this purpose has not met with widespread acceptance by the industry.

Starch and lignin based dispersants, although biodegradable, tend to be poorer performers compared to their polyacrylate counterparts.

SUMMARY OF THE INVENTION

Water soluble salts of β-polyaspartic acid are excellent agents for suspending in water a variety of inorganic and organic particles. Due to biodegradability of β-polyaspartic acid, its salts are acceptable for use in a variety of industrial products and processes.

DESCRIPTION OF PREFERRED EMBODIMENTS

Figure 1:
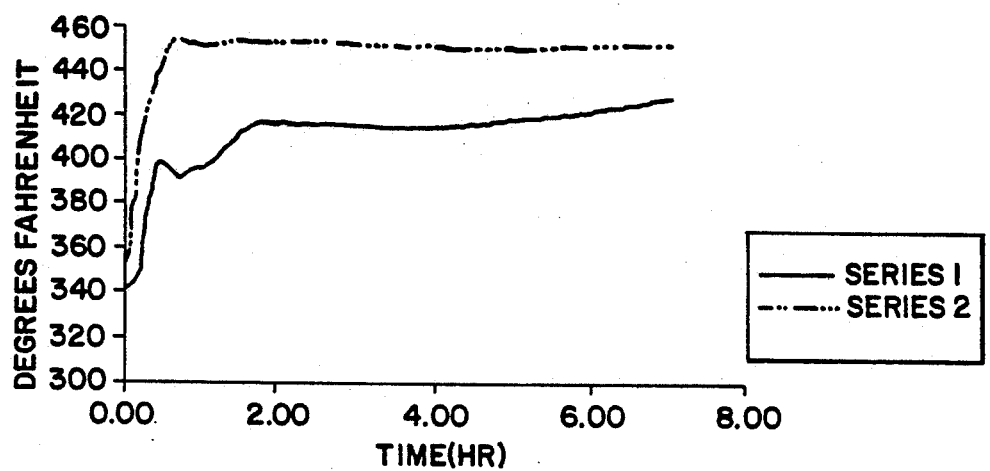
FIG. 1 depicts temperature versus time reaction curves for thermal condensation of L-aspartic acid; the interrupted line indicates the oil temperature in the reactor and the continuous line the reaction mixture temperature.

The starting polysuccinimides (anhydropolyaspartic acids) from which the β-polyaspartic acids are synthesized are produced by the thermal condensation of powdered L-aspartic acid at controlled temperatures to produce polysuccinimide in high yields. The term "yield" as used herein means the theoretical yield based on the starting molecular weight of the aspartic acid. The presently attainable relatively high yields optimally occur above the initiation temperature of 370° F., preferably occur above about 420° F., and most preferably occur above about 440° F.

While a reactant temperature of less than 370° F. may produce polysuccinimide over a period of many hours, the theoretical yields will be low. Usually, the conversion of the L-aspartic acid to polysuccinimide will be less than 70% and will require a reaction time period of many days. On the other hand, we have found that as the reactant temperature is increased in a controlled manner to above 370° F., the percent conversion increases to greater than 90% and the reaction times become greatly reduced.

The thermal condensation of L-aspartic acid to polysuccinimide using the above reaction conditions produces a characteristically shaped "temperature vs. time" reaction curve characterized by an initial, rapid rise in reactant temperature which is followed by an endotherm signalling the beginning of the reaction. Immediately following the onset of the endotherm there is evaporative cooling, followed first by a temperature rise, and then by a second endotherm, which is followed by an evaporative cooling plateau. The temperature then rises to a substantially constant temperature plateau. The condensation reaction has gone to at least 95% conversion at a temperature approximately midway between the final plateau and the time the temperature begins to rise to that plateau.

In the following examples, the color of each product sample was noted.

The color of L-aspartic acid is white. Polysuccinimides vary in color according to the temperature of the sample taken during the course of the reaction. From low temperature to high, the colors vary as follows: light pink, to pink, to tannish pink, to tan, to light yellow, to yellow. These colors generally correspond to the percent conversion of the L-aspartic acid, in the same order with light pink indicating the lowest percent conversion and yellow indicating the highest percent conversion. Products exhibiting the pink colors were found to have less than 70% conversion. Heretofore, the technical literature has never reported any other color but pink for thermally condensed L-aspartic acid. The polysuccinimides suitable for making the present dispersants for the practice of the method aspect of this invention are free of pure pink color. The polysuccinimides used to prepare the polyaspartic acid dispersants of this invention have a water content less than 1%. Usually such polysuccinimides are substantially water-free.

A series of experiments were conducted to thermally polymerize solid phase L-aspartic acid. In each instance, the powdered L-aspartic acid was added to an oil-jacketed reaction vessel and heated. Samples were taken throughout the polymerization reaction. Those samples were analyzed for percent conversion to the polysuccinimide. The color and temperature of the samples were noted as well.

Each of conversion, color, and production of polyaspartic acid are described below.

The conversion of L-aspartic acid to polysuccinimide was determined as follows: A specific amount of the reaction mixture or product was dissolved in an aliquot of dimethylformamide (DMF). The dissolution was allowed to proceed for 4 to 5 hours until all of the polysuccinimide dissolved in the DMF. Unreacted L-aspartic acid was filtered out. Conversion of L-aspartic acid was determined using the following formula:

$$\% \text{ CONVERSION} = \frac{A-B}{A} * 100\%$$

Where:
A = weight of initial sample
B = weight of residue (unreacted L-aspartic acid)

The percent conversion of the L aspartic acid to the polysuccinimide in the reaction can be increased in reduced time periods by increasing the temperatures used in a manner discussed in greater detail hereinbelow.

Where a thermal fluid is used to heat the L-aspartic acid and as its temperature is brought to a maintenance temperature of at least 480° F. in a reasonable time period, at least 90% conversion can be effected within 4 hours.

Where the thermal fluid used to heat the L-aspartic acid is brought to a maintenance temperature of at least 550° F. within a reasonable time period, at least 90% conversion can be effected within 2 hours.

Continuous and batch processes can be used. Some process examples include fluidized bed, stirred reactor, and indirectly heated rotary driers.

Once initiation temperature is achieved, temperatures in the range of 420°-520° F. produce polysuccinimide at yields greater than 80%. Typically at temperatures between 420°-450° F., 90% conversions will be obtained. 500° F. will produce a 90% conversion in 4 hours and 550° F. will produce a 90% conversion in 1.5-2 hours.

EXAMPLE 1

Preparation of Polysuccinimide

A 500-ml, covered, stainless steel beaker charged with 400 grams of powdered, L-aspartic acid was placed in an oil bath. The oil bath was quickly heated to a 450° F. maintenance temperature. The sample was stirred throughout the experiment.

The condensation reaction was observed to begin when the first endotherm was reached, after about 30 minutes. The first endotherm of the reaction mixture peaked at 395° F. at an oil temperature of 439° F.

Evaporative cooling immediately followed this first endotherm. Water loss was evidenced by the evolution of steam. The reaction mixture temperature dropped to a low of 390° F. during this period and the oil temperature rose to 450° F. maintenance temperature.

Following the temperature drop, the reaction mixture began to heat up. At about 1.7 hours, a second endotherm occurred. At this endotherm, the reaction mixture temperature was 420° F. and the oil temperature was 450° F. Steam coming from the system evidenced water loss.

Evaporative cooling continued to take place until the conclusion of the second endotherm. Water loss was evidenced by the evolution of steam.

At the conclusion of this period, the reaction mixture was then heated up and maintained at an equilibrium temperature of 434° F.

A "time vs. temperature" plot of the foregoing reaction is depicted in FIG. 1.

Table 1, below, provides data developed during this experiment. Samples were taken at the times indicated and analyzed for percent conversion to polysuccinimide.

The color of the reaction mixture is provided. Color was observed to vary with product temperature.

TABLE 1

| | POLYMERIZATION | | | |
|---|---|---|---|---|
| Time, hr | Product, °F. | Oil, °F. | Conv, % | Color |
| 0.0 | 340 | 345 | 0 | White |
| 0.5 | 400 | 440 | 22 | Light Pink |
| 1.1 | 396 | 451 | 23 | Light Pink |
| 1.7 | 422 | 457 | 32 | Pink |
| 4.2 | 416 | 451 | 58 | Pink |
| 5.5 | 420 | 452 | 81 | Tan |
| 7.1 | 430 | 454 | 97 | Tan |

EXAMPLE 2

Preparation of Polysuccinimide at Relatively Higher Temperatures

A 500-ml covered, stainless steel, beaker charged with 400 grams of powdered, L-aspartic acid was placed in an oil bath. The oil bath was quickly heated to a 500° F. maintenance temperature. The reaction mixture was stirred throughout the experiment.

At 30 minutes, the reaction began when the first endotherm was reached. The first endotherm of the reaction mixture peaked at 405° F. at an oil temperature of 465° F.

Evaporative cooling immediately followed the first endotherm. Water loss was evidenced by the evolution of steam. The reaction mixture temperature dropped to a low of 390° F. during this period, and the oil temperature rose to 490° F.

At about 1.3 hours, a second endotherm occurred. At this second endotherm, the reaction mixture temperature was 438° F. and the oil temperature was 495° F.

Evaporative cooling continued to take place until the conclusion of the second endotherm. Water loss was evidenced by the evolution of steam. The reaction mixture temperature dropped to a low of 432° F. during this period and the oil temperature rose to 499° F.

A diminution in evaporative cooling was evidenced by a steady rise in reaction mixture temperature between approximately 2.7 hours and 3.2 hours. At 3.2 hours a temperature plateau was attained. No further increase in conversion was noted beyond that point.

Figure 2:
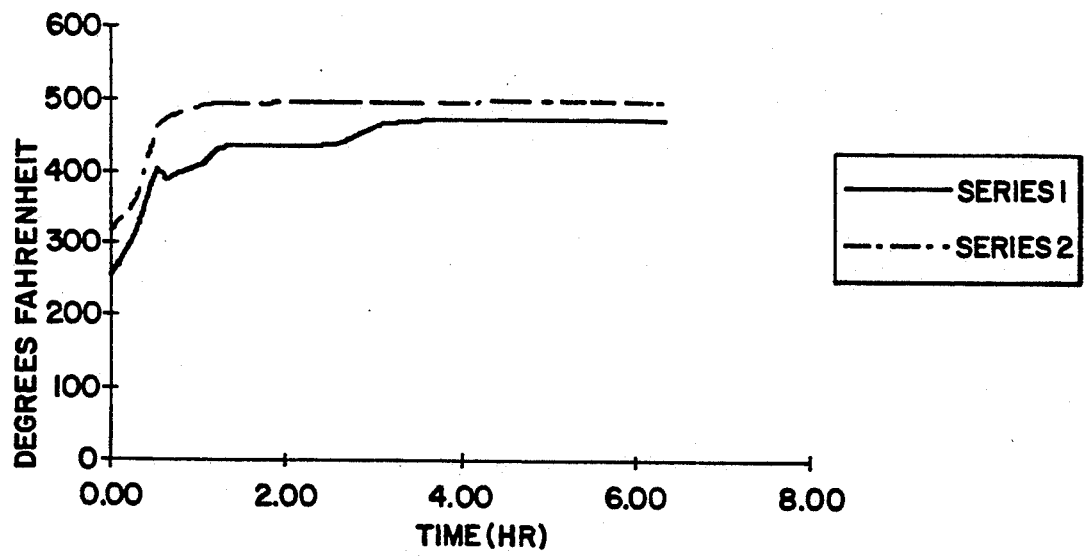
FIGS. 2-4 depict other temperature versus time reaction curves for thermal condensation of L-aspartic acid; again the interrupted line indicates the oil temperature in the reactor and the continuous line indicates the reaction mixture temperature.

A "time vs. temperature" plot of the foregoing reaction is depicted in FIG. 2.

Table 2, below, provides data developed during this experiment. Samples were taken at the times indicated and analyzed for percent conversion to polysuccinimide.

The color of the reaction mixture is provided. Color was observed to vary with product temperature.

TABLE 2

| | POLYMERIZATION | | | |
|---|---|---|---|---|
| Time, hr | Product, °F. | Oil, °F. | Conv, % | Color |
| 0.0 | 256 | 316 | 0 | White |
| 0.5 | 406 | 464 | 7 | Light Pink |
| 1.3 | 437 | 496 | 43 | Pink |

TABLE 2-continued

| | POLYMERIZATION | | | |
|---|---|---|---|---|
| Time, hr | Product, °F. | Oil, °F. | Conv, % | Color |
| 2.3 | 438 | 497 | 81 | Pink |
| 3.1 | 470 | 499 | 90 | Tannish Pink |
| 3.8 | 476 | 500 | 95 | Tannish Pink |
| 6.0 | 476 | 502 | 98 | Light Yellow |

EXAMPLE 5

Rapid Preparation of Polysuccinimide

A 500-ml covered, stainless steel, beaker charged with 400 grams of powdered, L-aspartic acid was placed in an oil bath. The oil bath was quickly heated to a 550° F. maintenance temperature. The sample was stirred throughout the experiment.

At 24 minutes, the reaction began when the first endotherm was reached. The first endotherm of the reaction mixture peaked at 410° F. at an oil temperature of 470° F.

Evaporative cooling immediately followed the first endotherm. Water loss was evidenced by the evolution of steam. The reaction mixture temperature dropped to a low of 395° F. during this period.

A second endotherm occurred at 1 hour at a reaction mixture temperature of 442° F.

Evaporative cooling continued to take place until the conclusion of the second endotherm. The reaction mixture temperature dropped to a low of 440° F. during this period.

A diminution in evaporative cooling was evidenced by a steady rise in reaction mixture temperature between approximately 1.5 hours and 2.1 hours. At about 2.1 hours a temperature plateau was attained. No further increase in percent conversion was noted beyond about 2 hours.

Figure 3:
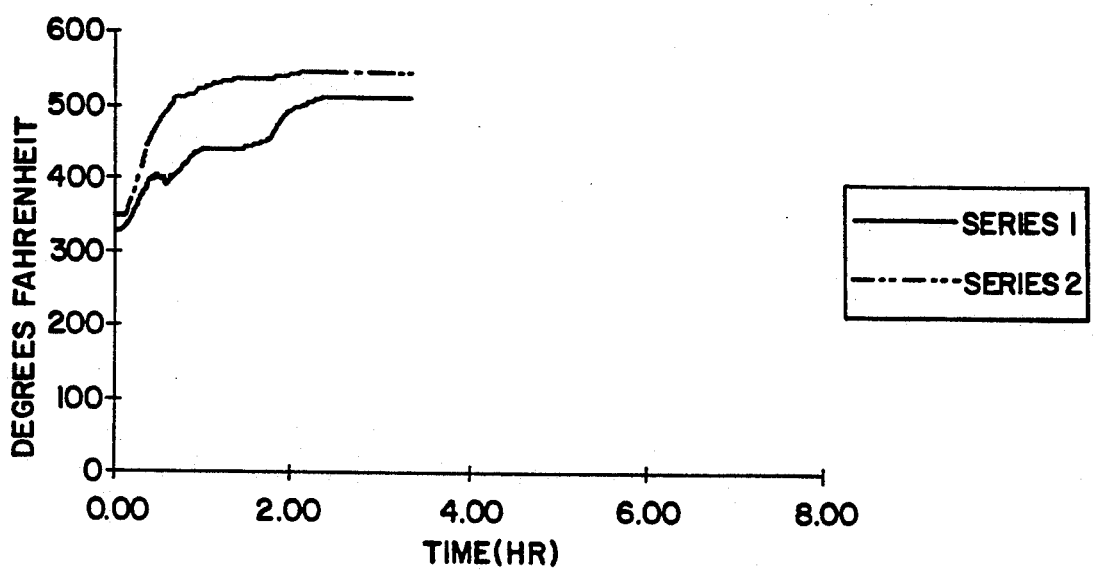

A "time vs. temperature" plot of the foregoing reaction is depicted in FIG. 3.

Table 3, below, provides data developed during this experiment. Samples were taken at the times indicated and analyzed for percent conversion to polysuccinimide.

The color of the reaction mixture is provided. Color was observed to vary with product temperature.

TABLE 3

| | POLYMERIZATION | | | |
|---|---|---|---|---|
| Time, hr | Product, °F. | Oil, °F. | Conv, % | Color |
| 0.0 | 330 | 348 | 0 | White |
| 0.5 | 405 | 470 | 11 | Light Pink |
| 1.0 | 436 | 520 | 36 | Light Pink |
| 1.4 | 439 | 536 | 66 | Pink |
| 1.8 | 462 | 540 | 92 | Tannish Pink |
| 2.0 | 495 | 544 | 94 | Tannish Pink |
| 2.4 | 510 | 547 | 96 | Light Yellow |
| 3.4 | 512 | 548 | 98 | Yellow |

Production scale product runs were conducted as follows:

EXAMPLE 4

Pilot Plant Test Run

PREPARATION OF POLYSUCCINIMIDE

A DVT-130 drier, mixer manufactured by the Littleford Brothers, Inc., of Florence, Ky. was used. The jacketed drier utilizes an oil as a thermal fluid and a plough blade impeller. The drier has a stack open to the atmosphere and a heat transfer area of 10 ft². The reactor's oil reservoir was preheated to 550° F. to provide an oil inlet temperature of about 500° F.

The reactor was charged with 110.4 lb of powdered, L-aspartic acid. Hot oil began to flow through the jacket, and the impeller speed was set at 155 rpm. Both the product and oil temperatures rose steadily. At a product temperature of 390° F., there was a sudden, endothermic reaction which caused the product temperature to drop (see FIG. 4). Water loss was evidenced by the evolution of steam. A sample taken revealed that the powder had changed from white to pink. Three percent of the material was converted to polysuccinimide.

Thereafter, product temperature began to rise steadily until it reached a plateau at 428° F. which continued for an hour. Throughout this whole reaction, steam evolved, and the conversion increased in a linear fashion. At the end of the hour, the product temperature rose to 447° F. at which time the reaction underwent a second endotherm. Immediately after this endotherm, steam ceased to evolve. Shortly after this point, the reaction was at least 88% complete. Following the second endotherm, the product slowly changed from a pink to a yellow color. The final conversion was measured at 97%.

Figure 4:
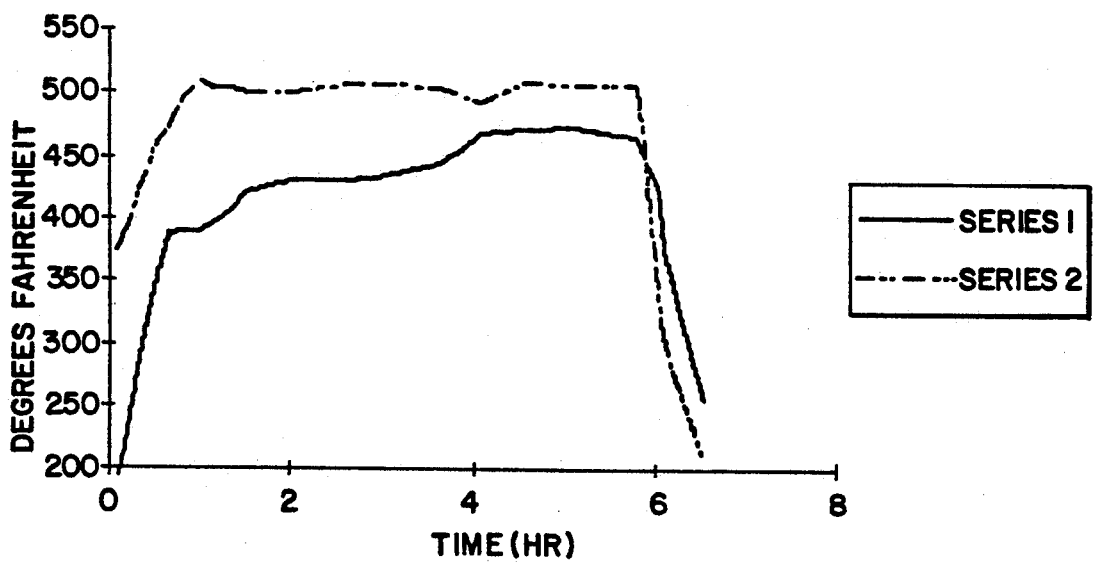

A "time vs. temperature" plot of the foregoing reaction is depicted in FIG. 4.

Table 4, below, provides data developed during this experiment. Samples were taken at the times indicated and analyzed for percent conversion to polysuccinimide.

TABLE 4

| | POLYMERIZATION | | | |
|---|---|---|---|---|
| Time, hr | Product, °F. | Oil, °F. | Conv, % | Color |
| 0.0 | 70 | 375 | 0 | Light Pink |
| 0.8 | 390 | 394 | 3 | Light Pink |
| 1.1 | 396 | 504 | 15 | Light Pink |
| 1.5 | 423 | 501 | 24 | Pink |
| 2.0 | 430 | 500 | 41 | Pink |
| 2.6 | 430 | 506 | 61 | Pink |
| 3.6 | 444 | 505 | 84 | Tannish Pink |
| 4.5 | 471 | 508 | 88 | Tannish Pink |
| 5.8 | 466 | 506 | 97 | Light Yellow |

The above data and procedures may be summarized as follows: Polysuccinimides may be produced using the steps of (a) heating powdered L-aspartic acid to at least 370° F. to initiate the condensation reaction, then (b) raising the reaction mixture temperature to at least 420° F., and (c) maintaining at least the 420° F. temperature until at least 80% conversion has occurred.

When the reaction mixture temperature is raised to at least 440° F. for a sufficient period of time a 95% conversion can be achieved.

PREPARATION OF β-POLYASPARTIC ACID SALTS

β-Polyaspartic acid salts suitable for use in practicing the present invention was produced from polysuccinimide using the hydrolysis procedure described below.

A slurry was made from a measured amount of polysuccinimide and softened water. Sodium hydroxide was added dropwise to hydrolyze polysuccinimide to the polyaspartic acid. The completion of the hydrolysis was attained at pH 9.5.

Bases other than sodium hydroxide can be used to produce the corresponding salts. Suitable bases include ammonium hydroxide, potassium hydroxide, and other alkaline and alkaline earth hydroxides, and the like.

Generally, the base can be added to the slurry until the pH has been raised to 9.5, and a clear solution has been formed.

The pH may be adjusted to higher levels, if desired. At pH values ranging between 11 and 12, the polyaspartic acid solutions have a bright yellow color. These higher pH solutions are useful when compatibility with higher pH slurries is required.

Polyaspartic acids are made up of alpha and beta peptide bonds. The polyaspartic acids used for dispersants to practice this invention contain between 50% to about 75% of beta peptide groups and can have a weight average molecular weight in the range of about 1,000 to about 5,000. The preferred dispersants contain 60% to 75% of beta peptide bonds.

Polyaspartic acid salts suitable for the present purposes are derived from polyaspartic acids that are made up of aspartic acid residues connected by means of predominantly beta($\beta$)-carbonyl peptide bonds although alpha($\alpha$)-carbonyl peptide bonds can be present as well. These polyaspartic acids can be represented by the general formula

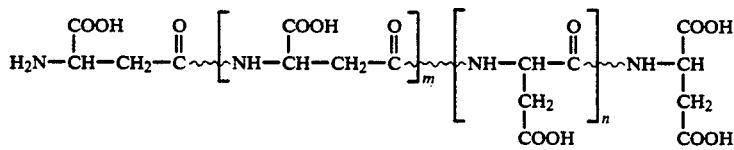

wherein m designates the number of beta linked residues and n designates the number of alpha linked residues with the further proviso that $m \geq n$. The weight average molecular weight of the presently contemplated polyaspartic acids within the purview of the foregoing formula is in the range of about 1,000 to about 5,000. That is, the suitable polyaspartic acids contain at least 50% of beta-linked residues, usually 50% to about 75% of beta-linked residues, and preferably about 60% to about 75% of beta-linked residues. The term "beta-polyaspartic acid" and "$\beta$-polyaspartic acid" are used herein to designate such acids where $m \geq n$ in the foregoing general formula.

Water-soluble salts of the $\beta$-polyaspartic acids are formed in the presence of counterions such as ammonium ($NH_4^+$), the alkaline cations such as $Na^+$, $K^+$, $Li^+$, the alkaline earth cations such as $Ca^{2+}$, $Mg^{2+}$, $Ba^{2+}$, as well as $Zn^{2+}$, $Fe^{2+}$, $Fe^{3+}$, $Co^{2+}$, and the like.

Gel permeation chromatography was utilized to determine the molecular weights of the $\beta$-polyaspartic acid produced. The molecular weight determinations were made on the polysuccinimide that was hydrolyzed using the hydrolysis procedure described herein. Rohm & Haas 2000 Mw polyacrylic acid and Rohm & Haas 4500 Mw polyacrylic acid were utilized as standards. The molecular weights provided for the $\beta$-polyaspartic acids as described herein and in the claims are based on these standards unless otherwise noted, and are reported as weight average molecular weights (Mw), because molecular weights based on gel permeation chromatography can vary with the standards utilized.

The molecular weights for the $\beta$-polyaspartic acid produced according to the hereinabove described procedure fell within the range of 1,000 Mw to 5,000 Mw, regardless of the degree of conversion.

A wide variety of both inorganic and organic particles can be effectively suspended by the present $\beta$-polyaspartic acid salts.

THE INORGANIC PARTICLES

One group of inorganic particles that can be effectively treated may be generically described as the alumino-silicates which encompass a wide number of clays. The alumino-silicates also include a large number of inorganic ion exchange materials illustrated by the base exchange clays and the synthetic zeolites illustrated by the molecular sieves. It is well known in the art that certain of the alumino-silicates described above contain elements other than aluminum, silicon, and oxygen. When such additional elements are present, for instance magnesium, the solids are considered to be alumino-silicates.

A particularly broad class of inorganic particles capable of being suspended by the present $\beta$-polyaspartic acid salts are pigments. Illustrative of such materials are the finely divided particles of calcium carbonate, titania, and silica. These materials find use in the form of aqueous suspension in the manufacture of paints, paper, ceramic slurries and many other well known commercial products.

The invention is particularly useful in its ability to produce stabilized iron oxide suspensions.

ORGANIC PARTICLES

These particles include a wide variety of organic materials illustrated by such materials as dirt, which includes silt. Other such organic materials are carbon particles and a variety of finely-divided water insoluble polymers which are often found in coating compositions in the form of latexes. Illustrative of such latexes are polystyrene, polyvinyl chloride, polyacrylonitrile, synthetic rubbers, e.g., polybutadienes, and the like. A particularly useful application for the suspending agents of the invention is their use in the suspension polymerization of a variety of water insoluble polymers.

The size of the particulate solids that may be suspended using the $\beta$-polyaspartic acid salts described herein will vary. The individual particles can be as small as 0.01 micron in diameter and as large as about 1 millimeter in diameter. Typical particle sizes of the suspended solids usually is in the range of 50–500 microns. The particle sizes are described herein with reference to the average particle size of the particular particulate substance present in a given suspension.

The amount of the water soluble salt of the $\beta$-polyaspartic acid used to suspend a variety of solids in water may range between 0.5 and 200 ppm, reported as $\beta$-polyaspartic acid. A typical dosage to suspend clays, iron oxides, dirt, and the like, is within the range of 1 to 50 ppm. The optimum dosage will depend upon the particular $\beta$-polyaspartic acid salt used, the pH value of the aqueous suspension, and the nature of the particles themselves with respect to their composition and size.

In the Examples below, the salt forms of the dispersants were used; however, the amounts thereof are calculated and reported as the corresponding acid so as to conform with industry practice.

EXAMPLE 5

Kaolin Dispersion

One gram of kaolin was mixed with $CaCl_2 \cdot 2H_2O$ in one liter of water. The pH of the resulting slurry was adjusted to a value of about 8.0 and poured into 100-ml graduated cylinders. Known concentrations of dispersants were then added to the cylinders and the contents thereof thoroughly mixed. A suspension without dispersant was used as control.

Aliquots were taken from the graduated cylinders at 2 and 24 hours and tested for dispersion using a Hach Laboratories' Model No. 1860A turbidimeter. The results were noted and reported in terms of relative Nephelometric Turbidity Units (NTU). Relatively higher NTU values correspond to superior kaolin dispersion by the polymers inasmuch as relatively higher NTU values indicate a relatively larger amount of particles in suspension.

The samples were also scanned with UV/VIS light from 900 nm to 200 nm and the absorbance (ABS) recorded at 450 nm.

The following results were obtained for Nephelometric Turbidity Units (NTU) and absorbance (ABS), respectively:

TABLE 5

| | | Dispersant | | | | | |
|---|---|---|---|---|---|---|---|
| | | β-Polyaspartic Acid, Na salt | | | Polyacrylic Acid, Na Salt | | |
| | Control | @ 10 ppm | @ 50 ppm | @ 100 ppm | @ 10 ppm | @ 50 ppm | @ 100 ppm |
| NTU (2 hours) | 61 | 150 | 150 | 150 | 150 | 150 | 130 |
| NTU (24 hours) | 10 | 45 | 65 | 82 | 25 | 25 | 28 |
| ABS (2 hours) | 0.19 | 0.95 | 0.98 | 0.98 | 0.65 | 0.54 | 0.44 |
| ABS (24 hours) | 0.03 | 0.12 | 0.16 | 0.21 | 0.07 | 0.06 | 0.07 |

EXAMPLE 6

Kaolin Dispersion with $Fe^{3+}$

This assay followed the same procedures as the kaolin dispersion test of Example 5 except that ferric chloride (10 ppm; calculated as $CaCO_3$) was added to each graduated cylinder. The following data compares polyaspartic acid salt performance with polyacrylic acid salt performance.

The observed results are set forth in Table 6, below.

TABLE 6

| | | Dispersant | | | | | |
|---|---|---|---|---|---|---|---|
| | | β-Polyaspartic Acid, Na salt | | | Polyacrylic Acid, Na salt | | |
| | Control | @ 10 ppm | @ 50 ppm | @ 100 ppm | @ 10 ppm | @ 50 ppm | @ 100 ppm |
| NTU (2 hours) | 36 | 150 | 120 | 150 | 150 | 140 | 140 |
| ABS (2 hours) | 0.11 | 0.89 | 0.38 | 0.92 | 0.66 | 0.48 | 0.47 |

EXAMPLE 7

Ferric Oxide Dispersion 700 ppm $Fe_2O_3$ were mixed with 200 ppm $Ca^{2+}$(calculated as $CaCO_3$) in one liter of water. The pH of the resulting slurry was adjusted to a fixed value. The slurry was thoroughly mixed and transferred to 100-ml graduated cylinders. Known concentrations of dispersants were added thereto.

Samples were taken at 4 hours and sample turbidity was measured with a Cole-Parmer Model No. 8391-35 nephelometer. The relatively higher NTU values correspond to superior ferric oxide dispersion by the polymers.

The results are reported below in Table 7.

TABLE 7

| | | Dispersant | | | | | |
|---|---|---|---|---|---|---|---|
| | | β-Polyaspartic Acid, Na salt | | | Polyacrylic Acid, Na salt | | |
| | Control | @ 1 ppm | @ 3 ppm | @ 100 ppm | @ 1 ppm | @ 3 ppm | @ 100 ppm |
| NTU (4 hours) | 181 | 233 | 222 | 284 | 196 | 209 | 210 |

EXAMPLE 8

Calcium Carbonate Dispersion

Freshly prepared, precipitated $CaCO_3$ was added to solutions containing 500 ppm of $Ca^{2+}$ (calculated as $CaCO_3$) and 250 ppm of $Mg^{2+}$ (added as $MgCl_2 \cdot 6H_2O$; calculated as $CaCO_3$) in one liter of water and were thoroughly mixed. The pH of the solution was adjusted to a value of about 9.0, and the solution was poured into 100-ml graduated cylinders. Next, 7 ppm of the dispersant were added to each aliquot of solution and the solutions were allowed to stand for 30 minutes and 1 hour.

Supernatant was taken from each cylinder and the turbidity of the samples was measured with a Cole-Parmer Model No. 8391-35 nephelometer. The relatively higher NTU values indicate superior calcium carbonate dispersion by the polymers.

The results are reported in Table 8, below.

TABLE 8

| | | Dispersant, 7 ppm | |
|---|---|---|---|
| | Control | β-Polyaspartic Acid, Na salt | Polyacrylic Acid, Na salt |
| NTU (30 min.) | 43.5 | 71.5 | 68.3 |
| NTU (1 hour) | 24.3 | 30.8 | 29.3 |

EXAMPLE 9

Titanium Dioxide Dispersion

One gram of titanium dioxide was mixed with 200 ppm $Ca^{2+}$ (calculated as $CaCO_3$) in one liter of water and adjusted to a fixed pH value of about 8.0. The resulting suspension was thoroughly stirred and poured into 100-ml graduated cylinders. Known amounts of dispersant were added to each.

Samples were taken at 2 and 24 hours, and the turbidity thereof was measured with a Cole-Parmer Model No. 8391-35 nephelometer. The relatively higher NTU values correspond to superior dispersion by the polymers.

The results are complied in Table 9, below.

TABLE 9

| | Control | Dispersant | | | | | |
|---|---|---|---|---|---|---|---|
| | | β-Polyaspartic Acid, Na salt | | | Polyacrylic Acid, Na salt | | |
| | | @ 1 ppm | @ 10 ppm | @ 100 ppm | @ 1 ppm | @ 10 ppm | @ 100 ppm |
| NTU (2 hours) | 282 | 320 | 412 | 459 | 331 | 480 | 594 |
| NTU (24 hours) | 21 | 22 | 36 | 49 | 23 | 41 | 44 |

EXAMPLE 10

Zinc Hydroxide Dispersion 250 ppm of $Ca^{2+}$ (calculated as $CaCO_3$) and 125 ppm $Mg^{2+}$ (added as $MgCO_3$; calculated as $CaCO_3$) were made into a solution. An inhibitor was added at this time prior to the addition of 0.01 g/L of zinc chloride. Equal amount of sodium hydroxide was added for each test. White precipitate of zinc hydroxide was evident. The activity of the dispersant was measured by nephelometry using a Cole-Parmer Model No. 8391-35 nephelometer. The higher the observed NTU values, the better the dispersant. The results of each test are reported in Table 10, below.

TABLE 10

| | Control | Dispersant | | | | | |
|---|---|---|---|---|---|---|---|
| | | β-Polyaspartic Acid, Na salt | | | Polyacrylic Acid, Na salt | | |
| | | @ 5 ppm | @ 10 ppm | @ 50 ppm | @ 5 ppm | @ 10 ppm | @ 50 ppm |
| NTU | 27 | 38 | 39 | 155 | 32 | 37 | 195 |

The β-polyaspartic acid utilized in Examples 5-10, above, was prepared in accordance with the procedure of Example 4, above.

EXAMPLE 11

Comparison of the Dispersion Activity of Various Polyaspartic Acids

Three different polyaspartic acid (PAA) salt forms were obtained. All three salts were sodium salts. Two were predominantly α-polyaspartic acid (Sigma Chemical Co., St. Louis, Mo. 63178, U.S.A.) derivatives and one was a derivative of predominantly β-polyaspartic acid, prepared in accordance with the procedure of Example 4, above. The molecular weights of each polyaspartic acid were determined using gel permeation chromatography. The efficacies of kaolin, iron oxide and soil dispersions utilizing the above mentioned forms of polyaspartic acids were compared nephelometrically. The turbidity of each dispersion was ascertained using a Cole-Parmer Model No. 8391-35 nephelometer. The observed dispersion data are presented in Table 11, below.

TABLE 11

| | DISPERSION DATA | | |
|---|---|---|---|
| Samples | Molecular Weight | NTU | % increase |
| Kaolin at 100 ppm of PAA for 2 hours | | | |
| Control | | 358 | — |
| β-polyaspartic acid, Na salt | 5000 | 410 | 15% |
| α-polyaspartic acid, Na salt | 5000 | 395 | 10% |
| α-polyaspartic acid, Na salt | 10000 | 400 | 12% |
| Iron Oxide at 100 ppm of PAA for 4 hours | | | |
| Control | | 335 | — |
| β-polyaspartic acid, Na salt | 5000 | 460 | 37.3% |
| α-polyaspartic acid, Na salt | 5000 | 367 | 9.7% |
| α-polyaspartic acid, Na salt | 10000 | 310 | −7.0% |
| Soil at 100 ppm of PAA for 2 hours | | | |
| Control | | 46 | — |
| β-polyaspartic acid, Na salt | 5000 | 55 | 19.5% |
| α-polyaspartic acid, Na salt | 5000 | 45 | −2% |
| α-polyaspartic acid, Na salt | 10000 | 52 | 12% |

Aqueous suspensions of other solids can be suspended effectively using β-polyaspartic acid salts as the suspending agent or dispersant. Table 12, below, sets forth the expected results.

TABLE 12

| Solids | Concentration of Solids (ppm) | β-Polyaspartic Acid Salt Dosage (ppm) | Expected Results |
|---|---|---|---|
| Kaolin | 1000 | 50 | excellent |
| Iron Oxide | 700 | 50 | good |
| Calcium Carbonate | 500 | 7 | good |
| Titanium Dioxide | 1000 | 10 | excellent |
| Zinc Hydroxide | 10 | 50 | fair |
| Bentonite | 1000 | 50 | excellent |
| Zeolite | 1000 | 50 | excellent |
| Silica | 2000 | 100 | poor |
| Carbon | 1000 | 50 | good |
| Proteins | 100 | 10 | excellent |
| Starch | 1000 | 50 | good |
| Dirt | 1000 | 50 | excellent |
| Calcium Phosphate | 1000 | 50 | good |
| Magnesium Hydroxide | 1000 | 50 | good |
| Magnesium Oxide | 1000 | 50 | excellent |
| Manganese Hydroxide | 100 | 50 | fair |

The foregoing description and examples are intended as illustrative but not limiting. Still other variations are possible without departing from the spirit and scope of the present invention.

What is claimed is:

1. An aqueous suspension of finely divided solid particles which are maintained in suspension by a suspension stabilizing amount of a water soluble salt of polyaspartic acid in which at least 50 percent of the amino acid residue linkages are beta-linkages and having a weight average molecular weight of about 1000 to about 5,000.

2. The aqueous suspension in accordance with claim 1 wherein the polyaspartic acid contains 50 percent to about 75 percent beta linkages.

3. The aqueous suspension in accordance with claim 1 wherein the polyaspartic acid contains 60 to about 75 percent beta linkages.

4. The aqueous suspension in accordance with claim 1 wherein the particles are inorganic particles.

5. The aqueous suspension in accordance with claim 4 wherein the inorganic particles are alumino-silicate particles.

6. The aqueous suspension in accordance with claim 5 wherein the alumino silicate is a zeolite.

7. The aqueous suspension in accordance with claim 4 wherein the inorganic particles are clay particles.

8. The aqueous suspension in accordance with claim 7 wherein the clay is kaolin.

9. The aqueous suspension in accordance with claim 4 wherein the inorganic particles are pigment particles.

10. The aqueous suspension in accordance with claim 4 wherein the inorganic particles are calcium carbonate particles.

11. The aqueous suspension in accordance with claim 4 wherein the inorganic particles are titanium dioxide particles.

12. The aqueous suspension in accordance with claim 4 wherein the inorganic particles are silica particles.

13. The aqueous suspension in accordance with claim 4 wherein the inorganic particles are iron oxide particles.

14. The aqueous suspension in accordance with claim 1 wherein the finely divided solid particles are organic material particles.

15. The aqueous suspension in accordance with claim 1 wherein the solid particles are carbon particles.

16. The aqueous suspension in accordance with claim 1 wherein the solid particles are dirt particles.

17. The aqueous suspension in accordance with claim 1 wherein the solid particles are water insoluble polymer particles.

* * * * *